J. R. KEMP.
ROTARY ENGINE ADAPTABLE AS MOTOR, PUMP, OR METER.
APPLICATION FILED JAN. 24, 1919.

1,407,659.

Patented Feb. 21, 1922.
5 SHEETS—SHEET 1.

Inventor:
James Reginald Kemp,
By Milans & Milans, Atty's.

UNITED STATES PATENT OFFICE.

JAMES REGINALD KEMP, OF NEWBURY, ENGLAND.

ROTARY ENGINE ADAPTABLE AS MOTOR, PUMP, OR METER.

1,407,659.  Specification of Letters Patent.  Patented Feb. 21, 1922.

Application filed January 24, 1919. Serial No. 272,881.

*To all whom it may concern:*

Be it known that I, JAMES REGINALD KEMP, a subject of the King of Great Britain, and a resident of "Oakhurst," Woodhay, Newbury, Berkshire, England, have invented an Improved Rotary Engine Adaptable as Motor, Pump, or Meter, of which the following is the specification.

This invention relates to a novel construction and arrangement of rotary engine which is capable of being employed as a motor, a pump, a blower or a meter. The rotary engine constructed according to this invention has a novel method or principle of operation of the cylinders, the pistons, and the shaft with relation to each other.

I may provide a pair of cylinders having their axes parallel. The cylinders are preferably formed integrally or in one casting. Each cylinder has a double ended piston fitted and adapted to reciprocate in its cylinder. The two double acting pistons are adapted to move together or simultaneously in their respective cylinders. Each of the said pistons may be formed in two portions for convenience of assembly and each piston or pair of pistons is mounted upon a guide plate. The said guide plate is rectangular in any cross section and it may be conveniently formed in two portions bolted together.

Formed integrally with the said shaft are wing plates of the same or approximately the same thickness as the diameter of the shaft. The said wing plates are preferably rectangular in section and are of equal length. The shaft wings or blocks are preferably of the same width. The wing plate may be formed hollow in order that there shall be no compression and expansion of the air in the ends or clearance spaces of the guide plate. When used as an internal combustion engine the wing plates are preferably closed and serve as pumps for delivering air or mixture to the working cylinders.

The said guide plates have fitted within same the said shaft and wing plates.

Clearance spaces are provided at each end of the guide plates to permit the pistons to reciprocate upon the shaft wing plates transversely, these spaces being preferably rather greater than the distance between the centres of rotation of the shaft and the casing.

Each side wall of the casting between the two cylinders is provided with a rim or flange which can be integrally formed with the cylinder casting, but the rim is preferably formed as a separate sleeve bolted to the cylinders, which sleeves constitute the bearings of the cylinders. These bearings are carried on standards or vertical plates secured to or integrally formed with the base plate.

Mounted in the same plates or standards are other bearings eccentrically arranged to and within the first mentioned bearings, and these bearings carry the shaft of the engine which extends through the said cylinders, the outer bearings surrounding the inner.

Constructed for use as an internal combustion engine each outer end of the cylinders is formed with a port providing communication between the combustion chambers at each end of the pair of cylinders so that the clearance spaces at the end of each cylinder form one combustion and compression chamber communicating through the said port.

On the end of each pair of cylinders having a common combustion chamber, I provide a rotary valve as afterward described, the one valve serving as an induction or inlet valve, and also as an exhaust valve.

The pair of cylinders, the contained pistons, and the shaft with its wing plates, all rotate together in the same direction and at the same speed, and the cylinders being mounted eccentrically with respect to the shaft causes the reciprocation of the pistons within the cylinders and upon the wing plates within the pistons, the degree of movement being determined by the eccentricity of the casing relatively to the rotating shaft.

The packing rings provided for each end of each piston may be conveniently fitted in grooves formed in the cylinder walls to reduce the overall length of cylinders and pistons.

Whether the engine be employed as a motor or as a pump, in order to provide against want of balance, two, three, or more such pairs of cylinders with pistons adapted to reciprocate therein may be fitted on one shaft. If two such pairs of cylinders are fitted, the cylinders may be oppositely arranged. If three such pairs of cylinders are fitted on one shaft they will be arranged at 120 degrees.

It will be understood that although the engine is shown in the accompanying drawings, which are to a certain extent diagrammatic, adapted for operation as an internal combustion engine it may be by making the necessary modifications adapted for use as a pump or meter.

Figure 2:
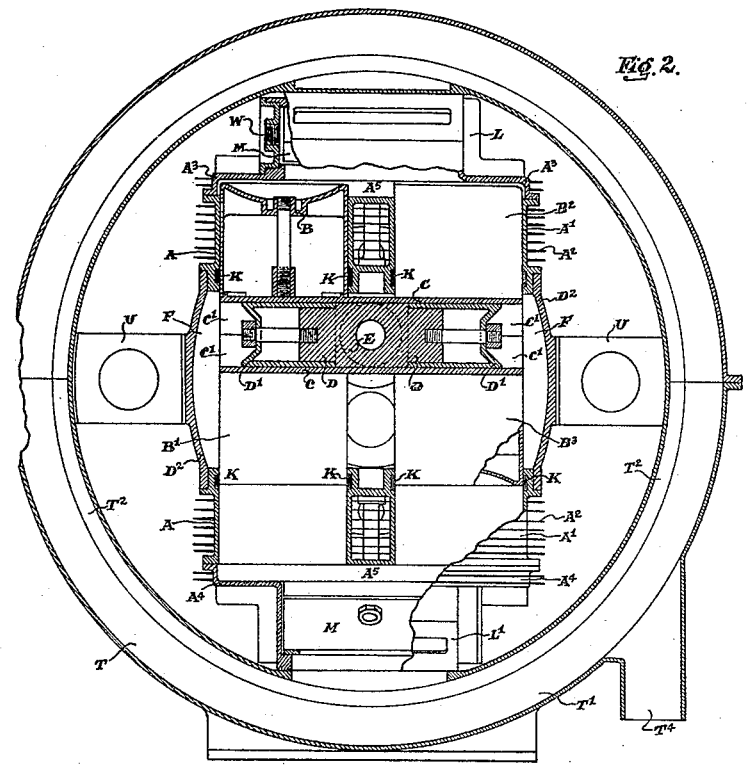
Fig. 2 is a sectional elevation through the pair of cylinders at a right angle to that shown in Fig. 1, and transversely to the rotating shaft.
Figure 4:
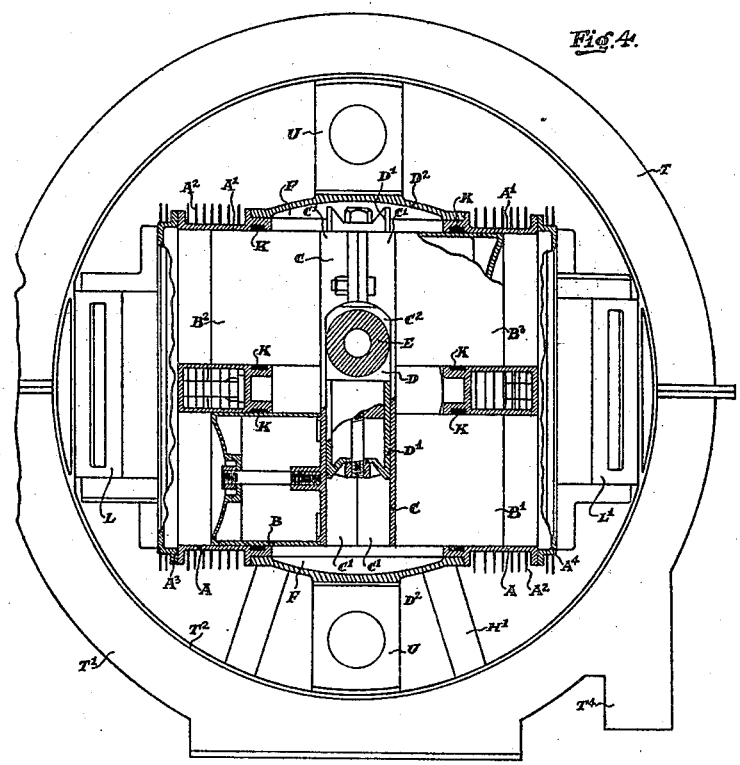
Fig. 4 is a sectional elevation similar to that in Fig. 2, but with all the pistons at midstroke.

A, $A^1$, are the two cylinders preferably formed in one casting with cooling ribs $A^2$ on the exterior of same. The axes of the two cylinders are parallel and the cylinders are provided at each end with a common cover plate $A^3$ $A^4$ respectively. At the outer ends of the cylinders next the cover a port $A^5$ is provided which permits free communication between the two cylinders providing a common combustion and compression chamber at each end of the cylinders A $A^1$, see Figs. 2 and 4.

The pistons B, $B^1$, are arranged to reciprocate within the cylinder A and the pistons $B^2$ $B^3$ in the cylinder $A^1$. All the four pistons, see Fig. 2, (the piston B is in section and the piston $B^3$ part section) are rigidly secured by bolts to the guide plates C. The guide C is made in two portions of channel section bolted together for convenience of assembly, the two parts forming a rectangular slide way within which the wing plates or blocks D slide and reciprocate. The side flanges $C^1$ $C^1$ of the channel guide C are cut away at the centre forming a slot $C^2$, see Fig. 4, to permit of the lateral reciprocation of the pistons upon the shaft E. The wing plates or blocks D are formed integrally with the shaft E. The wing plates D are provided with lighter extensions of same $D^1$ at each end rigidly bolted to the wing plates D to prolong the working or sliding surfaces. When the pistons are at midstroke as in Fig. 4, the shaft wing plate extensions $D^1$ extend into one of the clearance spaces F provided, fitted with disc cover plates $D^2$ bolted to the sides of the cylinders.

Figure 1:
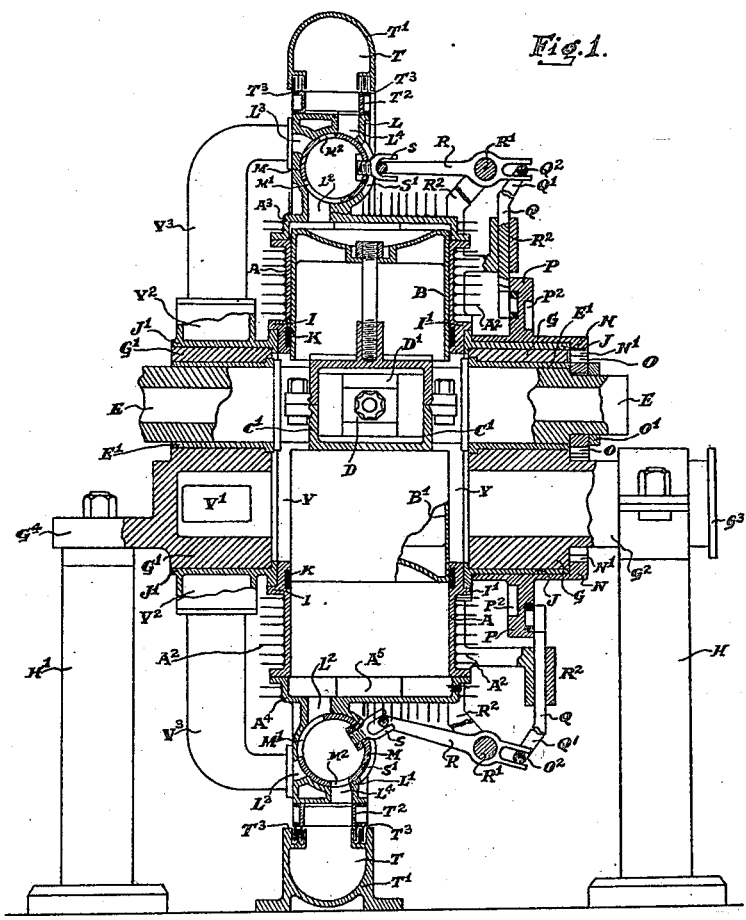
Fig. 1 is a diagrammatic sectional elevation in two planes, the one through the axial plane of one of the cylinders showing the two pistons therein, and the other through a plane coincident with the axes respectively of the rotating shaft and of the drums or discs carrying the cylinders.
Figure 3:
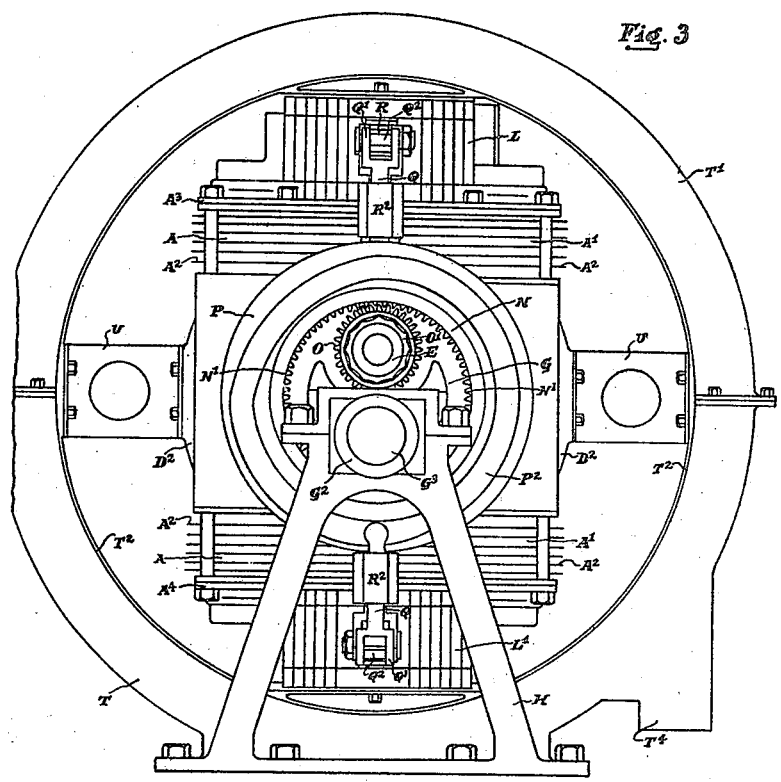
Fig. 3 is an end elevation of the engine.

Referring to Figs. 1 and 3, the shaft E is mounted to rotate in bearings $E^1$ (Fig. 1) which are fitted eccentrically in the discs or eccentric sheaves G, $G^1$. The discs or eccentric sheaves G, $G^1$, are supported by and rigidly bolted to the standards or pedestals H, $H^1$. The standard H has the eccentric sheave G clamped thereto by means of a tube or short stationary shaft $G^2$ to the outer end of which $G^3$ the carburetter or other fuel supplying means may be connected. The standard $H^1$ has the eccentric sheave $G^1$ bolted thereto by a lug $G^4$.

The shoulders I, $I^1$, integrally formed with the two cylinders have secured inside same by screws or bolts the sleeves J which surround the exterior of the discs or sheaves G, $G^1$, and are a rotating fit thereon. In this manner the two cylinders rotate upon the discs or eccentric sheaves G, $G^1$, and by the rotation of the cylinders the pistons B, $B^1$, $B^2$, $B^3$, by means of the channel guides C fitting the block or wing plates D which are formed integrally with the shaft, rotate the shaft E and at the same speed as the cylinders.

While therefore the pistons reciprocate in the cylinders during rotation, the guide plates slide and reciprocate upon the shaft wing plates or block, the stroke of all the pistons being equal to twice the distance between the shaft axis and the axial centre line of the two discs or sheaves G, $G^1$.

Packing means are provided consisting of a single ring K, one such ring for each piston. The ring is fitted in a groove in the cylinder wall coincident with the inmost position of the piston stroke as in Fig. 2. Each ring is made of slightly less diameter, when free, than the piston, so that when fitted it shall press inwardly upon the piston.

Constructed as shown for an internal combustion engine, the preferred arrangement of valve and valve operating gear is as shown in the drawing, but it will be understood that other suitable valves and valve gear may be employed with the engine described herein.

The cylindrical valve casings L, $L^1$, are secured to the cylinder covers $A^3$, $A^4$, respectively and the port $L^2$ in each casing is always open to the common combustion chamber at the end of each pair of cylinders. The construction and operation at each end is similar.

Each cylindrical valve casing has in addition to the said port $L^2$ two other ports both relatively long and narrow, the one $L^3$ for inlet, the other $L^4$ for exhaust.

Within the cylindrical valve casing L the oscillating cylindrical valve M is fitted (and in describing the one valve the description applies to the other). The valve M may be split longitudinally in the centre line of the port $M^1$ cut therein, and the valve is preferably made of slightly larger diameter than the casing so that it may spring outwardly therein and fit the casing more closely to prevent leakage of gases. The port $M^1$ is of sufficient width to be always open to the port $L^2$ in the casing during the oscillation of the valve so that the cylindrical interior of the valve is always in communication with the combustion chamber in the cylinders. The port M² is oscillated to register with the inlet port L³ of the casing during the suction stroke and to register with the exhaust port L⁴ of the casing during the exhaust stroke as shown in the valve casing L¹ on the lower side of Fig. 1. At the commencement of the compression stroke the port M² is moved to the midway position between the inlet and exhaust ports and retained there during the compression and explosion strokes as shown in the valve casing L on the upper side of Fig. 1.

Figure 5:
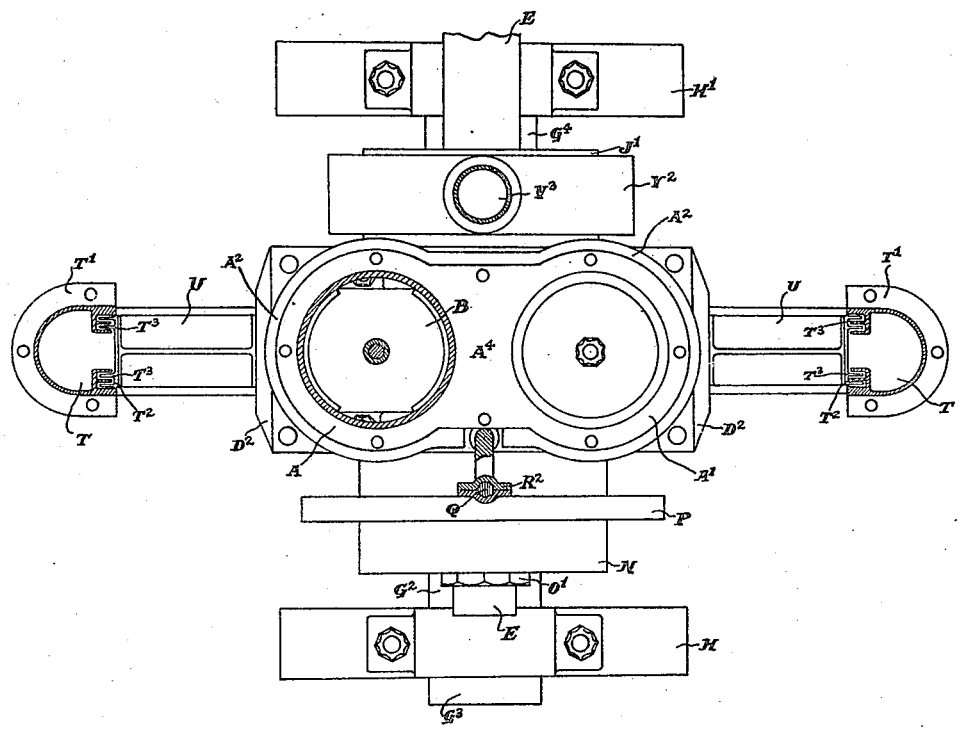
Fig. 5 is a diagrammatic plan of the engine.

The sleeve ring N is rotatively fitted upon the exterior of the sleeve J which is secured to the cylinders. The ring N is provided with the internal teeth N¹ on its outer edge, which internal teeth gear with the external teeth of the spur wheel O which is secured by a key and the nut O¹ to the shaft E. The ring N has integrally formed therewith the cam disc P. The cam disc P is provided with two cam grooves P¹ and P². The rollers of the slide rods Q, Q, engage in the cam grooves P¹, P². The slide rods Q operate similarly. Each has the fork Q¹ at its other end carrying the pin Q² which engages in the slotted fork in one arm of the oscillating lever R which is fulcrumed at R¹ on the bracket R² secured to the cylinders. The other end of the lever R engages in the slot of the fork S which is secured in the rotary valve M, a slot S¹ being formed in the wall of the valve casing to permit of the oscillating of the fork S. The cam grooves are of such form as shown in Fig. 3, that the valves are oscillated by means of their slide rods and oscillating levers to open the exhaust port during the exhaust stroke, the inlet port during the induction stroke, and to retain each valve in the closed position as shown in the valve casing L, Fig. 1, during the compression and working strokes in each pair of cylinders. The valve in the valve casing L¹ at the lower end of Fig. 1, is shown with its fork in the extreme position at one end of its stroke in the casing slot S¹, and the combustion products exhausting through the valve into the exhaust receiver T. This exhaust receiver is constructed as an annular chamber surrounding the engine as shown in transverse section in Figs. 1 and 5, in central plane section in Fig. 2, and in elevation in Figs. 3 and 4. The stationary portion T¹ of the annular chamber T is supported on the same base plate as that on which the standards H, H¹, are secured. The inner annular wall T² of the chamber T is secured to and rotates with the valve casings L, L¹; it is further supported by the carriers U projecting from each side of the cylinders (see Figs. 2, 3 and 4). The annular rotating portion T² of the chamber T is provided with two or more annular fins T³, (two are shown) which loosely intermesh with corresponding fins of which three are shown secured to the stationary portion of the exhaust receiver T¹. An outlet from the receiver may be provided at T⁴.

The fuel supply means or carburetter is connected to the end G³ of the tubular supply channel in the stationary support of the drum G and thence to the inner chamber V. The mixture then passes through ports V¹ of which one is shown in the section Fig. 1, formed in the drum or sheave G¹. A plurality of corresponding ports, not shown, are formed in the sleeve J¹ which during the rotation of the sleeve upon the drum successively register with the ports V¹ and allow the passage therethrough of the mixture to the rotating annular chamber V² to which the inlet pipes V³ are connected; the other end of the said pipes are connected to the inlet port L³ in the valve casing L.

The ignition plug is screwed in at W. The charge therefore is ignited within the rotary valve M.

It must be understood that I do not claim anything contained in my application filed January 16, 1919, Serial No. 271,456 having the same title as the present specification, and relating to an engine having a somewhat similar method or principle of operation but in which there was not provided a cylinder nor a piston of the ordinary form.

What I do claim as my invention and desire to secure by Letters Patent is:—

1. In a rotary engine, the combination of a fixed drum having an eccentrically arranged shaft bearing, a pair of cylinders rigidly secured together in parallel relation supported upon said drum for rotation on an axis at right angles to the longitudinal axes of the cylinders, reciprocating pistons in the cylinders, and a power shaft mounted for rotation in the eccentric bearing of the drum and a lateral sliding connection between the power shaft and pistons.

2. In a rotary engine, the combination of a fixed drum having an eccentrically arranged shaft bearing therein, a pair of cylinders rigidly secured together in parallel relation and supported upon the drum for rotation on an axis at right angles to the longitudinal axes of the cylinders, two reciprocating pistons in each cylinder, a power shaft mounted for rotation in the eccentric bearing of the drum, and a guide plate slidably connected with the power shaft and to which the pistons are connected.

3. In a rotary engine, the combination of a fixed drum having an eccentrically arranged shaft bearing therein, a pair of cylinders rigidly secured together in parallel relation and supported upon the drum for rotation on an axis at right angles to the longitudinal axes of the cylinders, two reciprocating pistons in each cylinder, a power shaft mounted for rotation in the eccentric bearing of the drum and provided with wing plates, a tubular slide slidable upon the said wing plates and to which the pistons are connected, said slide comprising channel members secured together and having slots at its sides for the power shaft.

4. In a rotary engine, the combination of a pair of spaced parallel fixed drums having eccentrically arranged shaft bearings therein in longitudinal alinement, a pair of cylinders rigidly secured together in parallel relation and provided with cylindrical bearings arranged centrally of the pair of cylinders at opposite sides thereof, said cylindrical bearings rotatably fitting upon the fixed drums, two pistons in each of the cylinders, all of the pistons being connected for reciprocation together in the cylinders, a power shaft mounted for rotation in the eccentric bearing of the fixed drums, and a sliding connection between the pistons and the power shaft.

5. In a rotary engine, the combination of a fixed drum having an eccentrically arranged bearing shaft therein, a pair of cylinders rigidly secured together in parallel relation and supported upon the drum for rotation on an axis at right angles to the longitudinal axes of the cylinders, two pistons in each of the cylinders, all of the pistons being connected for reciprocation together in the cylinders, a power shaft mounted for rotation in the eccentric bearing of the drum and operatively connected with the pistons, and means providing communication between adjacent ends of the cylinders.

6. In a rotary engine, the combination of a fixed drum having an eccentrically arranged bearing shaft therein, a pair of cylinders rigidly secured together in parallel relation and supported upon the drum for rotation on an axis at right angles to the longitudinal axes of the cylinders, two pistons in each of the cylinders, all of the pistons being connected for reciprocation together in the cylinders, a power shaft mounted for rotation in the eccentric bearing of the drum and operatively connected with the pistons, a pipe connection between adjacent ends of the cylinders, fuel supply conduits leading to each of said pipe connections, and a regulating valve for each of said fuel supply conduits.

7. In a rotary engine, the combination of a fixed drum having an eccentrically arranged shaft bearing, a pair of cylinders rigidly secured together in parallel relation and supported upon said drum for rotation on an axis at right angles to the longitudinal axes of the cylinders, two pistons in each of the cylinders, all of the pistons being connected for reciprocation together in the cylinders, a power shaft mounted for rotation in the eccentric bearing of the fixed drum and operatively connected with the pistons, rotary valves on the pair of cylinders at opposite ends thereof, and valve operating mechanism including a cam disk rotatably mounted upon the fixed drum and provided with cam grooves at opposite sides thereof, a drive gear connection between the cam disk and the power shaft, and parts engaging the cam grooves and operatively connected with the rotary valves.

8. In a rotary engine, the combination of a fixed drum having an eccentrically arranged shaft bearing therein, a pair of cylinders rigidly secured together in parallel relation and supported upon the drum for rotation on an axis at right angles to the longitudinal axes of the cylinders, reciprocating pistons within the cylinders, exhaust ports at the outer ends of the pair of cylinders, an annular exhaust chamber comprising a fixed part and a part secured to the cylinders to rotate therewith and slidably fitting the fixed part, and a power shaft mounted for rotation in the eccentric bearing of the drum and operatively connected with the pistons.

JAMES REGINALD KEMP.